United States Patent
Tseng

(10) Patent No.: US 12,397,381 B2
(45) Date of Patent: Aug. 26, 2025

(54) METHOD OF USING TIG WELDING FLUX FOR SUPER DUPLEX STAINLESS STEEL

(71) Applicant: NATIONAL PINGTUNG UNIVERSITY OF SCIENCE & TECHNOLOGY, Pingtung County (TW)

(72) Inventor: Kuang-Hung Tseng, Pingtung County (TW)

(73) Assignee: NATIONAL PINGTUNG UNIVERSITY OF SCIENCE & TECHNOLOGY, Pingtung County (TW)

( * ) Notice: Subject to any disclaimer, the term of this patent is extended or adjusted under 35 U.S.C. 154(b) by 431 days.

(21) Appl. No.: 18/103,506

(22) Filed: Jan. 31, 2023

(65) Prior Publication Data

US 2023/0166365 A1     Jun. 1, 2023

Related U.S. Application Data

(62) Division of application No. 17/037,806, filed on Sep. 30, 2020, now abandoned.

(30) Foreign Application Priority Data

Dec. 12, 2019  (TW) ................................ 108145532
Sep. 24, 2020  (TW) ................................ 109133135

(51) Int. Cl.
*B23K 35/362*   (2006.01)
*B23K 103/04*   (2006.01)

(52) U.S. Cl.
CPC ........ *B23K 35/362* (2013.01); *B23K 2103/05* (2018.08)

(58) Field of Classification Search
CPC .......................... B23K 35/362; B23K 2103/05
See application file for complete search history.

(56) References Cited

U.S. PATENT DOCUMENTS 7,896,979 B2    3/2011   Tseng et al.
10,792,769 B2   10/2020  Tseng
(Continued)

FOREIGN PATENT DOCUMENTS

JP    2000102890 A  *  4/2000
SU      1362598 A1  * 12/1987

OTHER PUBLICATIONS

JP 2000102890 A machine translation (Year: 2000).*
SU 1362598 A1 machine translation (Year: 1987).*

*Primary Examiner* — Tima M. McGuthry-Banks
(74) *Attorney, Agent, or Firm* — WPAT, PC

(57) ABSTRACT

A method of using a tungsten inert gas (TIG) welding flux for super duplex stainless steel (SDSS) is used to solve the problems of low weld depth/width ratio, low corrosion resistance, and arc blow existing in the conventional TIG welding flux for duplex stainless steel. The TIG welding flux for SDSS includes 20-30 wt % of silicon dioxide ($SiO_2$), 20-25 wt % of titanium dioxide ($TiO_2$), 15-20 wt % of vanadium dioxide ($VO_2$), 10-15 wt % of molybdenum trioxide ($MoO_3$), 10-15 wt % of zirconium diboride ($ZrB_2$), 5-10 wt % of aluminum nitride (AlN), 5-10 wt % of manganese carbonate ($MnCO_3$) and 5-10 wt % of nickel carbonate ($NiCO_3$).

6 Claims, 2 Drawing Sheets

(56) References Cited

U.S. PATENT DOCUMENTS

2015/0132173 A1  5/2015  Bruck et al.
2019/0176272 A1* 6/2019  Tseng ................... B23K 35/362
2019/0372449 A1  12/2019 Mills

* cited by examiner

METHOD OF USING TIG WELDING FLUX FOR SUPER DUPLEX STAINLESS STEEL

CROSS REFERENCE TO RELATED APPLICATIONS

This is a divisional application of U.S. patent application Ser. No. 17/037,806 filed on Sep. 30, 2020, which was abandoned on Aug. 9, 2023. Moreover, the application claims the benefit of Taiwan application serial No.108145532, filed Dec. 12, 2019, as well as of Taiwan application serial No. 109133135, filed Sep. 24, 2020, the entire contents of which are incorporated herein by reference.

BACKGROUND OF THE INVENTION

1. Field of the Invention

The present invention generally relates to a method of using a welding flux and, more particularly, to a method of using a tungsten inert gas (TIG) welding flux for super duplex stainless steel (SDSS).

2. Description of the Related Art

Duplex stainless steel (DSS) belonging to Fe—Cr—Ni alloy has a two-phase structure consisting of austenite and ferrite, in which both austenite and ferrite phase should be more than 30% and less than 70%. Due to the two-phase structure, DSS has advantages of both ferrite and austenite stainless steels. That is, DSS has better fracture toughness, better intergranular corrosion resistance, and is easier to be welded than ferritic stainless steel. DSS has properties the same as ferritic stainless steel such as small coefficient of thermal expansion and high thermal conductivity. Moreover, DSS has a two-fold yield strength compared to austenitic stainless steel, a resistance to chloride-induced stress corrosion cracking significantly higher than SUS 304 austenitic stainless steel, and a pitting corrosion resistance, as well as a crevice corrosion resistance, equal to SUS 316 austenitic stainless steel.

Compared to standard DSS such as SAF 2205/UNS 532205, SDSS such as SAF 2507/UNS 532750 has excellent pitting and crevice corrosion resistances due to extremely low carbon content, high molybdenum and nitrogen contents. As a specialized stainless steel with excellent advantages such as good corrosion resistance, great mechanical strength and easily manufactured, SDSS is widely applied to high value-added metal products such as heat exchanger, petrochemical equipment, oil and gas pipelines and seawater desalination plant.

The welding quality of SDSS depends on the ferrite/austenite phase ratio in the weld metal and the heat-affected zone (HAZ). However, the fast cooling, after the welding process, causes increased ferrite phase in the weld metal and the HAZ, reducing the corrosion resistance of the weld metal and the HAZ. It can be seen that the ferrite/austenite phase ratio in the weld metal and the HAZ should be strictly controlled during the welding process for SDSS. That is, the weld metal and the HAZ should have ferrite phase less than 50%. Alternatively, the weld metal and the HAZ should have austenite phase more than 50%.

Taiwan patent number I 633059 discloses a conventional welding flux for DSS, which includes 25-35 wt % of silicon dioxide ($SiO_2$), 20-25 wt % of chromium oxide ($Cr_2O_3$), 10-20 wt % of molybdenum trioxide ($MoO_3$), 10-15 wt % of nickel oxide (NiO), 5-10 wt % of ferric oxide ($Fe_2O_3$), 5-10 wt % of cobalt oxide ($Co_3O_4$), 5-10 wt % of manganese dioxide ($MnO_2$) and 3-5 wt % of copper oxide (CuO). When two DSS workpieces, made of SAF 2205/UNS 532205 as an example, are joined by the TIG welding process utilizing the conventional welding flux for DSS, a weld formed between the two joined DSS workpieces has a higher weld depth/width ratio (D/W ratio) and a better corrosion resistance. However, if the conventional welding flux for DSS is utilized to join two SDSS workpieces, such as the workpieces made of SAF 2507/UNS 532750, by the TIG welding, a weld formed between the two joined SDSS workpieces cannot has a higher weld D/W ratio and a better corrosion resistance. Moreover, arc blow occurs during the TIG welding for SDSS.

In light of this, it is necessary to provide a method of using a TIG welding flux for SDSS.

SUMMARY OF THE INVENTION

It is therefore an objective of the present invention to provide a method of using a TIG welding flux for SDSS, which is suitable to join two SDSS workpieces.

"A" or "an" used in the elements and components recited in the disclosure of the present invention is for convenient use and provides generally meanings of the scope of the present invention. "A" or "an" used in the present invention is interpreted as comprising one or at least one, and the single concept also includes plural conditions, otherwise obviously indicating other meanings.

One embodiment of the present invention discloses the method of using the TIG welding flux for SDSS includes dispersing the TIG welding flux for SDSS in a volatile solvent, forming a paste-like slurry. The TIG welding flux for SDSS includes 20-30 wt % of silicon dioxide ($SiO_2$), 20-25 wt % of titanium dioxide ($TiO_2$), 15-20 wt % of vanadium dioxide ($VO_2$), 10-15 wt % of molybdenum trioxide ($MoO_3$), 10-15 wt % of zirconium diboride ($ZrB_2$), 5-10 wt % of aluminum nitride (AlN), 5-10 wt % of manganese carbonate ($MnCO_3$) and 5-10 wt % of nickel carbonate ($NiCO_3$). The paste-like slurry is then spread on surfaces of two workpieces of SDSS, and a TIG welding process is performed to join the two workpieces of SDSS into a welded assembly.

Accordingly, when two SDSS workpieces are joined by the TIG welding process utilizing the TIG welding flux for SDSS, with specific weight percentages of $SiO_2$, $TiO_2$, $VO_2$, $MoO_3$, $ZrB_2$, AlN, $MnCO_3$ and $NiCO_3$, according to the present invention, a weld between the two joined SDSS workpieces has a higher weld D/W ratio and a better corrosion resistance. Moreover, no arc blow occurs during the TIG welding.

In preferred form shown, the TIG welding flux for SDSS includes 5-9 wt % of AlN, 5-7 wt % of $MnCO_3$ and 5-7 wt % of $NiCO_3$. With such performance, the weld between the two jointed SDSS workpieces has a higher weld D/W ratio and a better corrosion resistance. Moreover, no arc blow occurs during the TIG welding.

In preferred form shown, the TIG welding flux for SDSS includes 5 wt % of AlN, 5 wt % of $MnCO_3$ and 5 wt % of $NiCO_3$. With such performance, the weld between the two jointed SDSS workpieces has a higher weld D/W ratio and a better corrosion resistance. Moreover, no arc blow occurs during the TIG welding.

In preferred form shown, the TIG welding flux for SDSS further includes a volatile solvent. With such performance, a plurality of powdered particles including $SiO_2$, $TiO_2$, $VO_2$, $MoO_3$, $ZrB_2$, AlN, $MnCO_3$ and $NiCO_3$ can be dispersed in the volatile solvent to form a paste-like slurry, thus can be easily spread on surface of the two SDSS workpieces.

In preferred form shown, the volatile solvent can include methanol, acetone or isopropanol. With such performance, after being spread on surface of the two SDSS workpieces, the volatile solvent of the TIG welding flux for SDSS can evaporate quickly, thus shorten the waiting time of welder.

In preferred form shown, the TIG welding flux for SDSS has a plurality of powdered particles each having a diameter of 50-90 μm. With such performance, the plurality of powdered particles can form a homogeneous mixture with great uniformity. As such, the TIG welding flux for SDSS can be easily spread on surface of the two SDSS workpieces. Also, the welding flux for SDSS can be easily melted by a heat source, and the weld depth can therefore be increased. In addition, the residual slag easily forms when the TIG welding process is carried out with the TIG welding flux for SDSS having the plurality of powdered particles with the diameter larger than 90 μm, while the more TIG welding flux for SDSS is needed when the TIG welding process is carried out with the TIG welding flux for SDSS having the plurality of powdered particles with the diameter smaller than 50 μm, increasing manufacturing costs. That is, with the plurality of powdered particles with the diameter of 50-90 μm, the TIG welding flux for SDSS can not only prevent from residual slag formation but also reduce the manufacturing costs.

As a result, when two SDSS workpieces are joined by the TIG welding process utilizing the TIG welding flux for SDSS, with specific weight percentages of $SiO_2$, $TiO_2$, $VO_2$, $MoO_3$, $ZrB_2$, MN, $MnCO_3$ and $NiCO_3$, according to the present invention, a weld between the two joined SDSS workpieces has a weld D/W ratio more than or equal to 0.8. Thus, a relative smaller HAZ can be obtained, reducing the risk of problems such as thermal deformation and residual stress of the weldment. The weld metal has a higher austenite phase content than a ferrite phase content, improving the corrosion resistance of the weld. Moreover, no arc blow occurs during the TIG welding.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
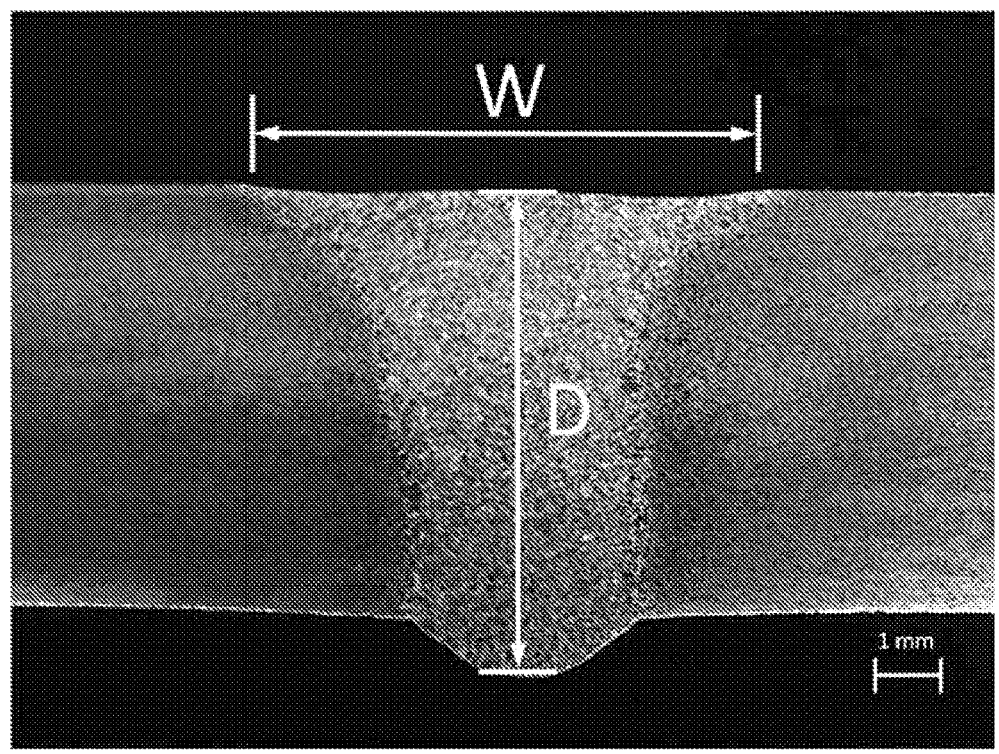
FIG. 1 depicts a cross-sectional view of a weld of group B08, which is formed between joined two SDSS workpieces by the TIG welding process utilizing the TIG welding flux of group A08.

A TIG welding flux for SDSS according to a specific embodiment of the present invention can include 20-30 wt % of $SiO_2$ (silicon dioxide), 20-25 wt % of $TiO_2$ (titanium dioxide), 15-20 wt % of $VO_2$ (vanadium dioxide), 10-15 wt % of $MoO_3$ (molybdenum trioxide), 10-15 wt % of $ZrB_2$ (zirconium diboride), 5-10 wt % of AlN (aluminum nitride), 5-10 wt % of $MnCO_3$ (manganese carbonate) and 5-10 wt % of $NiCO_3$ (nickel carbonate). In another specific embodiment, the TIG welding flux for SDSS includes 9 wt % of AlN, 5 wt % of $MnCO_3$ and 5 wt % of $NiCO_3$. In another specific embodiment, the TIG welding flux for SDSS includes 5 wt % of AlN, 6 wt % of $MnCO_3$ and 5 wt % of $NiCO_3$. In another specific embodiment, the TIG welding flux for SDSS includes 5 wt % of AlN, 5 wt % of $MnCO_3$ and 5 wt % of $NiCO_3$. In another specific embodiment, the TIG welding flux for SDSS includes 9 wt % of AlN, 5 wt % of $MnCO_3$ and 6 wt % of $NiCO_3$. In another specific embodiment, the TIG welding flux for SDSS includes 6 wt % of AlN, 6 wt % of $MnCO_3$ and 5 wt % of $NiCO_3$. In another specific embodiment, the TIG welding flux for SDSS includes 5 wt % of AlN, 10 wt % of $MnCO_3$ and 5 wt % of $NiCO_3$.

Accordingly, when two SDSS workpieces are joined by the TIG welding process utilizing the TIG welding flux for SDSS, with specific weight percentages of $SiO_2$, $TiO_2$, $VO_2$, $MoO_3$, $ZrB_2$, AlN, $MnCO_3$ and $NiCO_3$, according to the present invention, a weld between the two joined SDSS workpieces has a weld D/W ratio more than or equal to 0.8. Thus, a relative smaller HAZ can be obtained, reducing the risk of problems such as thermal deformation and residual stress of the weldment. The weld metal has a higher austenite phase content than a ferrite phase content, improving the corrosion resistance of the weld. Moreover, no arc blow occurs during the TIG welding.

In a specific embodiment, the TIG welding flux for SDSS according to the present invention can further include a volatile solvent. In another specific embodiment, the volatile solvent can include, but not limited to, methanol, acetone or isopropanol.

In a specific embodiment, the TIG welding flux for SDSS according to the present invention can have a plurality of powdered particles each having a diameter of 50-90 μm.

In a specific embodiment, the TIG welding flux for SDSS according to the present invention can be applied to join two workpieces made of SDSS including, but not limited to, UNS S32750 and UNS S32760.

To validate whether a weld between the two joined SDSS workpieces has a higher weld D/W ratio and a better corrosion resistance, as well as whether arc blow occurs during the TIG welding, when two SDSS workpieces are joined by the TIG welding process utilizing the TIG welding flux for SDSS according to the present invention, the following trials are carried out.

Trial (A).

Powdered particles of $SiO_2$, $TiO_2$, $VO_2$, $MoO_3$, $ZrB_2$, AlN, $MnCO_3$ and $NiCO_3$ are mixed according to TABLE 1. The TIG welding fluxes of groups A1-A15 are prepared by forming paste-like slurries by dispersing the mixtures in acetone.

TABLE 1

| Groups | $SiO_2$ (wt %) | $TiO_2$ (wt %) | $VO_2$ (wt %) | $MoO_3$ (wt %) | $ZrB_2$ (wt %) | AlN (wt %) | $MnCO_3$ (wt %) | $NiCO_3$ (wt %) |
|---|---|---|---|---|---|---|---|---|
| A01 | 20 | 20 | 15 | 11 | 11 | 10 | 7 | 6 |
| A02 | 20 | 25 | 15 | 10 | 15 | 5 | 5 | 5 |

TABLE 1-continued

| Groups | $SiO_2$ (wt %) | $TiO_2$ (wt %) | $VO_2$ (wt %) | $MoO_3$ (wt %) | $ZrB_2$ (wt %) | AlN (wt %) | $MnCO_3$ (wt %) | $NiCO_3$ (wt %) |
|---|---|---|---|---|---|---|---|---|
| A03 | 20 | 22 | 16 | 15 | 10 | 6 | 6 | 5 |
| A04 | 21 | 21 | 18 | 10 | 10 | 9 | 5 | 6 |
| A05 | 23 | 20 | 20 | 10 | 10 | 5 | 5 | 7 |
| A06 | 25 | 20 | 15 | 10 | 10 | 5 | 10 | 5 |
| A07 | 25 | 20 | 15 | 10 | 10 | 5 | 5 | 10 |
| A08 | 26 | 20 | 15 | 10 | 10 | 9 | 5 | 5 |
| A09 | 28 | 20 | 15 | 10 | 10 | 5 | 6 | 5 |
| A10 | 30 | 20 | 15 | 10 | 10 | 5 | 5 | 5 |
| A11 | 20 | 25 | 20 | 15 | 10 | 0 | 5 | 5 |
| A12 | 25 | 23 | 15 | 10 | 15 | 2 | 0 | 10 |
| A13 | 25 | 22 | 15 | 10 | 15 | 3 | 10 | 0 |
| A14 | 28 | 21 | 15 | 10 | 15 | 7 | 2 | 2 |
| A15 | 30 | 20 | 15 | 11 | 11 | 4 | 5 | 4 |

Moreover, powdered particles of $SiO_2$, $Cr_2O_3$, $MoO_3$, NiO, $Fe_2P_3$. $Co_3O_4$, $MnO_2$ and CuO are mixed according to TABLE 2. The conventional TIG welding flux of group A16 is prepared by forming paste-like slurries by dispersing the mixtures in acetone.

TABLE 2

| Group | $SiO_2$ (wt %) | $Cr_2O_3$ (wt %) | $MoO_3$ (wt %) | NiO (wt %) | $Fe_2O_3$ (wt %) | $Co_3O_4$ (wt %) | $MnO_2$ (wt %) | CuO (wt %) |
|---|---|---|---|---|---|---|---|---|
| A16 | 30 | 23 | 12 | 10 | 7 | 10 | 5 | 3 |

Trial (B).

In this trial, UNS 532750 plates with thickness being 6.0 mm are used as the SDSS workpieces. After removing contaminants attached on surface of the SDSS workpieces using a 400-grit silicon carbide sandpaper. The SDSS workpieces are swiped by acetone wipes. Then, the paste-like slurries formed by TIG welding fluxes for SDSS of groups A01-A16 are spread on surface of the two SDSS workpieces. The TIG welding process is carried out after acetone is completely evaporated to obtain the welded assembly (the joined two workpieces) of groups B1-B16, as shown in TABLE 3. In addition, a welded assembly of group B17 is obtained by the TIG welding without the TIG welding flux of groups A01-16.

TABLE 3

| Group | TIG welding flux used during the TIG welding |
|---|---|
| B01 | Group A01 (the TIG welding flux for SDSS according to the present invention) |
| B02 | Group A02 (the TIG welding flux for SDSS according to the present invention) |
| B03 | Group A03 (the TIG welding flux for SDSS according to the present invention) |
| B04 | Group A04 (the TIG welding flux for SDSS according to the present invention) |
| B05 | Group A05 (the TIG welding flux for SDSS according to the present invention) |
| B06 | Group A06 (the TIG welding flux for SDSS according to the present invention) |
| B07 | Group A07 (the TIG welding flux for SDSS according to the present invention) |
| B08 | Group A08 (the TIG welding flux for SDSS according to the present invention) |
| B09 | Group A09 (the TIG welding flux for SDSS according to the present invention) |
| B10 | Group A10 (the TIG welding flux for SDSS according to the present invention) |
| B11 | Group A11 (the TIG welding flux without AlN) |
| B12 | Group A12 (the TIG welding flux without $MnCO_3$) |
| B13 | Group A13 (the TIG welding flux without $NiCO_3$) |
| B14 | Group A14 (the TIG welding flux with 2% of $MnCO_3$ and 2% of $NiCO_3$) |
| B15 | Group A15 (the TIG welding flux with 4% of $NiCO_3$) |
| B16 | Group A16 (the conventional TIG welding flux) |
| B17 | No |

During the TIG welding for obtaining the joined two SDSS workpieces of groups B01-B17, the occurrences of arc blow are recorded. After the TIG welding, cross sections of the joined two SDSS workpieces of groups B01-B17 are obtained. The weld depth "D" and the bead width "W" of the resultant weld between the joined two SDSS workpieces of groups B01-B17 are recorded. NM stands for not measured. The weld D/W ratio of groups B01-B17 is calculated. Moreover, the ferrite phase content of the weld metal between the joined two SDSS workpieces of groups B01-B17 is also measured, and the ferrite/austenite phase ratio is calculated. All results are shown in TABLE 4.

TABLE 4

| Groups | Weld depth (mm) | Bead width (mm) | Weld D/W ratio | Ferrite/ austenite phase ratio | Arc blow occurs |
|---|---|---|---|---|---|
| B01 | 5.7 | 7.1 | 0.80 | 38%/62% | No |
| B02 | 5.8 | 6.9 | 0.84 | 47%/53% | No |
| B03 | 6.0 | 6.8 | 0.88 | 41%/59% | No |
| B04 | 6.2 | 7.0 | 0.89 | 40%/60% | No |
| B05 | 6.1 | 7.1 | 0.86 | 46%/54% | No |
| B06 | 5.9 | 6.8 | 0.87 | 45%/55% | No |
| B07 | 5.8 | 7.0 | 0.83 | 44%/56% | No |
| B08 | 7.1 | 7.3 | 0.97 | 40%/60% | No |
| B09 | 6.8 | 7.4 | 0.92 | 47%/53% | No |
| B10 | 6.9 | 7.6 | 0.91 | 46%/54% | No |

TABLE 4-continued

| Groups | Weld depth (mm) | Bead width (mm) | Weld D/W ratio | Ferrite/ austenite phase ratio | Arc blow occurs |
|---|---|---|---|---|---|
| B11 | NM | NM | NM | 58%/42% | Yes |
| B12 | 4.1 | 9.6 | 0.43 | 56%/44% | Yes |
| B13 | NM | NM | NM | 55%/45% | Yes |
| B14 | NM | NM | NM | 53%/47% | Yes |
| B15 | NM | NM | NM | 54%/46% | Yes |
| B16 | NM | NM | NM | 60%/40% | Yes |
| B17 | 2.8 | 10.7 | 0.26 | 64%/36% | No |

Figure 2:
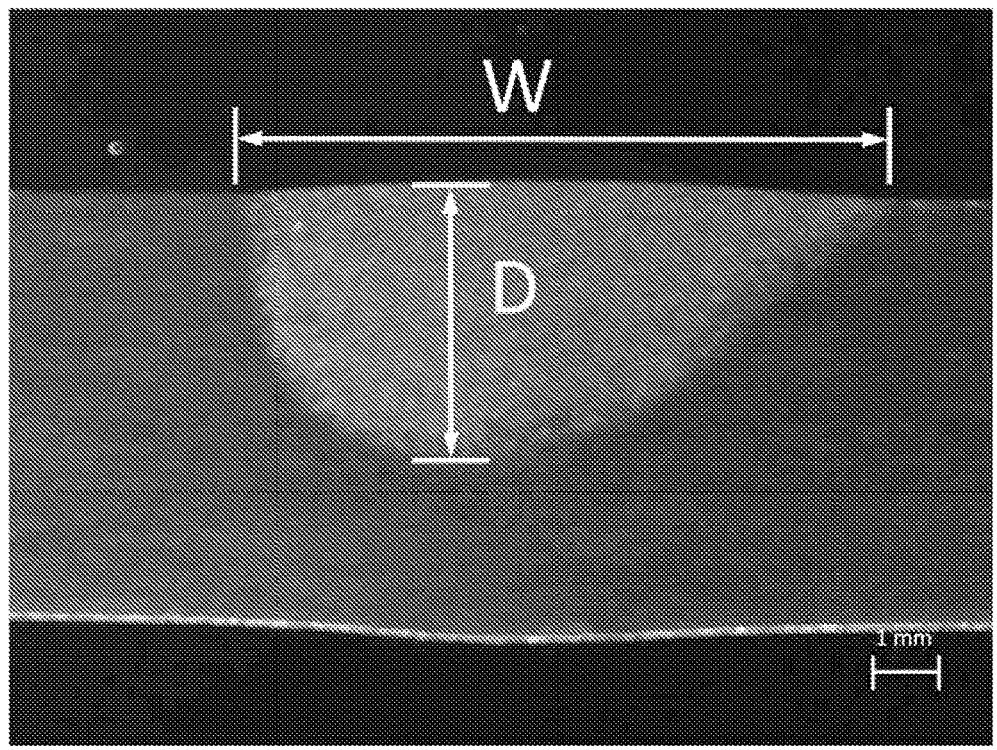
FIG. 2 depicts a cross-sectional view of a weld of group B12, which is formed between joined two SDSS workpieces by the TIG welding process utilizing the TIG welding flux of group A12.
Figure 3:
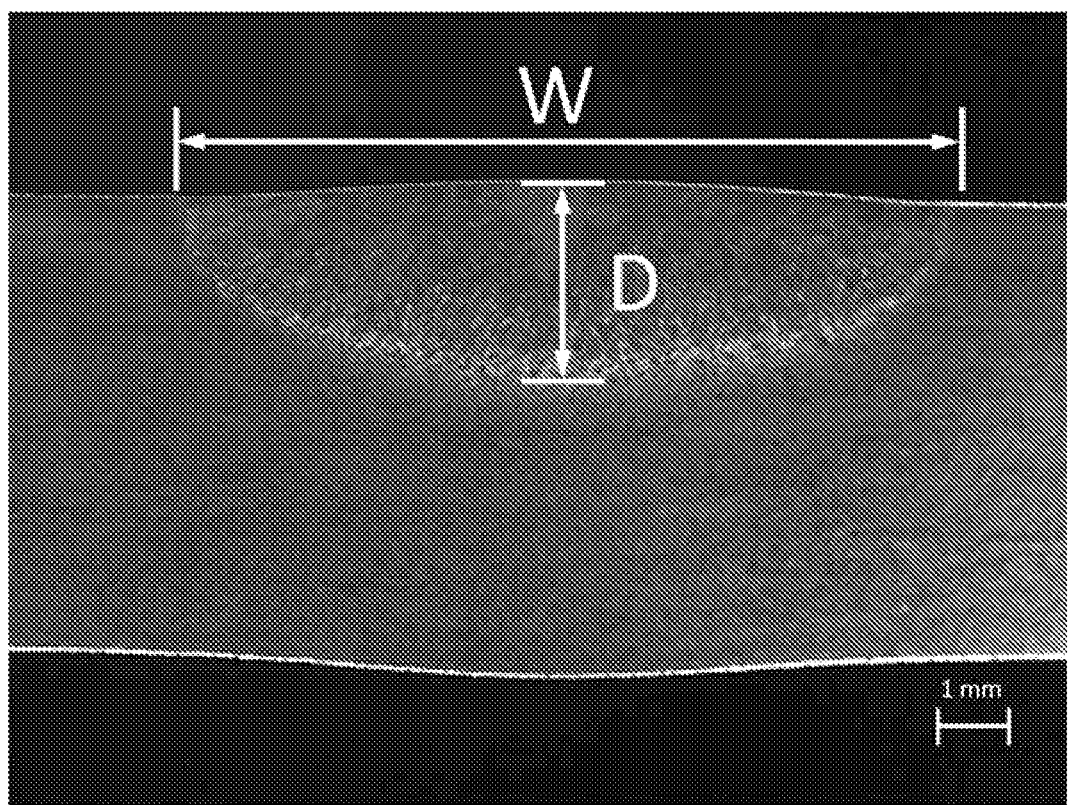
FIG. 3 depicts a cross-sectional view of a weld of group B17, which is formed between joined two SDSS workpieces by the TIG welding process without the TIG welding flux.

FIGS. 1-3 show the cross sections of the joined two SDSS workpieces of groups B08, B12 and B17, respectively. The weld between the jointed two SDSS workpieces of group B08 completely penetrates the SDSS workpiece, while the weld between the two jointed SDSS workpieces of groups B12 and B17 cannot completely penetrate the SDSS workpiece. Moreover, referring to TABLE 3 and FIGS. 1-3, compared to the welds between the jointed two SDSS workpieces of groups B12 and B17, the welded joint of groups B01-B10 has an increased weld depth and a reduced bead width. The weld D/W ratio of the resultant weld of groups B01-B10 is more than or equal to 0.8, and even up to 0.97. Thus, relative smaller HAZ can be obtained, reducing the risk of problems such as thermal deformation and residual stress of the weldment.

Moreover, referring to TABLE 3, compared to the welds between the jointed two SDSS workpieces of groups B11-B17, the welds between the jointed two SDSS workpieces of groups B01-B10 have a lower ferrite phase content, which is lower than 50%. That is, the welds between the jointed two SDSS workpieces of groups B01-B10 have an austenite phase content higher than the ferrite phase content, indicating the weld between the jointed two SDSS workpieces of groups B01-B10 have good corrosion resistance. In addition, no arc blow occurs during the TIG welding for forming the joined two SDSS workpieces of groups B01-B10.

Accordingly, when two SDSS workpieces are joined by the TIG welding process utilizing the TIG welding flux for SDSS, with specific weight percentages of $SiO_2$, $TiO_2$, $VO_2$, $MoO_3$, $ZrB_2$, AlN, $MnCO_3$ and $NiCO_3$, according to the present invention, the weld between the two joined SDSS workpieces has a weld D/W ratio more than or equal to 0.8. Thus, a relative smaller HAZ can be obtained, reducing the risk of problems such as thermal deformation and residual stress of the weldment. The weld metal has a higher austenite phase content than a ferrite phase content, improving the corrosion resistance of the weld. Moreover, no arc blow occurs during the TIG welding.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A method of using a tungsten inert gas (TIG) welding flux for super duplex stainless steel (SDSS), comprising:
dispersing the TIG welding flux for SDSS in a volatile solvent, forming a slurry paste, wherein the TIG welding flux for SDSS comprises 20-30 wt % of silicon dioxide ($SiO_2$), 20-25 wt % of titanium dioxide ($TiO_2$), 15-20 wt % of vanadium dioxide ($VO_2$), 10-15 wt % of molybdenum trioxide ($MoO_3$), 10-15 wt % of zirconium diboride ($ZrB_2$), 5-10 wt % of aluminum nitride (AlN), 5-10 wt % of manganese carbonate ($MnCO_3$) and 5-10 wt % of nickel carbonate ($NiCO_3$);
spreading the slurry paste on surfaces of two workpieces of SDSS; and
performing a TIG welding process to join the two workpieces of SDSS into a welded assembly.

2. The method of using the TIG welding flux for SDSS as claimed in claim 1, wherein the TIG welding flux for SDSS comprises 5-9 wt % of AlN, 5-7 wt % of $MnCO_3$ and 5-7 wt % of $NiCO_3$.

3. The method of using the TIG welding flux for SDSS as claimed in claim 1, wherein the TIG welding flux for SDSS comprises 5 wt % of AlN, 5 wt % of $MnCO_3$ and 5 wt % of NiCO3.

4. The method of using the TIG welding flux for SDSS as claimed in claim 1, wherein the volatile solvent comprises methanol, acetone or isopropanol.

5. The method of using the TIG welding flux for SDSS as claimed in claim 1, wherein the TIG welding flux for SDSS has a plurality of powdered particles each having a diameter of 50-90 μm.

6. The method of using the TIG welding flux for SDSS as claimed in claim 1, wherein the TIG welding flux for SDSS comprises 5 wt % of AlN, 10 wt % of $MnCO_3$ and 5 wt % of $NiCO_3$.

* * * * *